W. H. CULP.
Lamp Chimney.
No. 49,089. Patented Aug. 1, 1865.
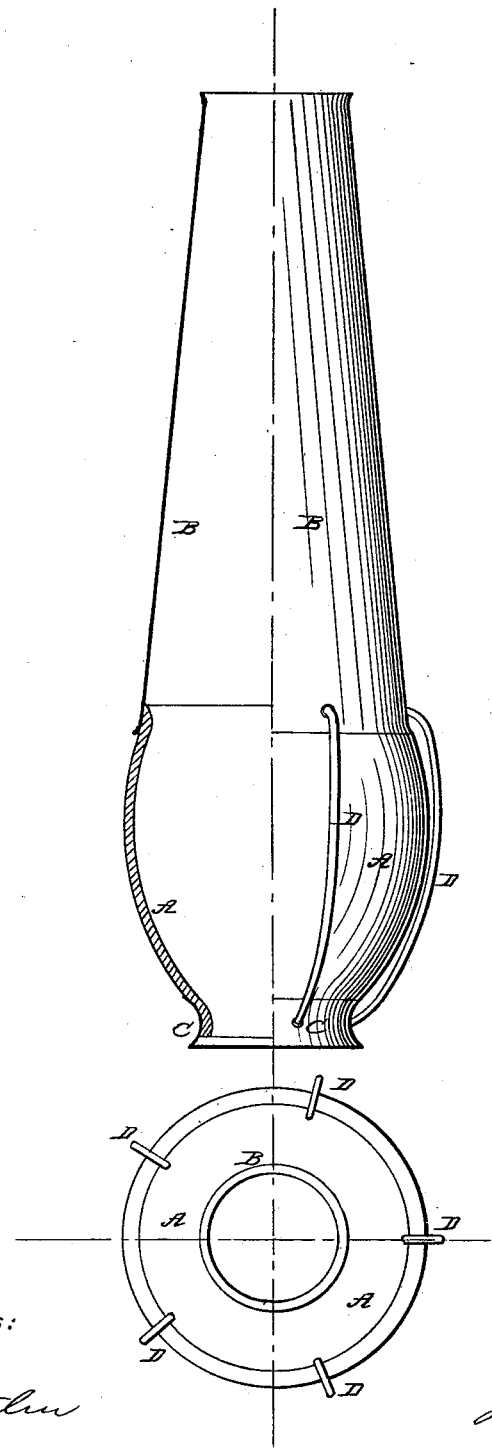

UNITED STATES PATENT OFFICE.

WM. H. CULP, OF HAMMONDSVILLE, OHIO.

IMPROVEMENT IN LAMP-CHIMNEYS.

Specification forming part of Letters Patent No. 49,089, dated August 1, 1865.

*To all whom it may concern:*

Be it known that I, WILLIAM H. CULP, of Hammondsville, Jefferson county, in the State of Ohio, have invented certain new and useful Improvements in Lamp-Chimneys; and I do hereby declare that the following is a full and exact description thereof, reference being had to the accompanying drawing, and to the letters of reference marked thereon.

The nature of my invention consists in making only that part of the chimney which surrounds the flame out of glass, while the upper part (about two-thirds of the whole length) is made of sheet metal, and the lower rim, by which it is secured to the lamp, is also of metal, the glass portion being inserted into and between the two metallic portions, which are connected by means of several wires, which at the same time serve to guard the glass.

In the drawing, A represents the glass portion of the lamp-chimney; B, the metallic chimney. This chimney should be formed of a piece of sheet metal rolled in the desired conical form, with its edges slightly lapped, so as to admit of expansion and contraction without injury to the glass. Its lower edge should be rolled so as to leave a suitable groove to be fitted around the upper part of the glass shade A.

C is the metallic rim passing around the bottom of the glass, and serves to attach the chimney to the lamp. This rim C is formed of a strip of sheet metal curved into a trough and then rolled into a ring, with the concavity outward, so that it shall conform to the curve of the lower part of the glass shade A. The ends of this rim may not quite touch each other, or they may overlap each other, so as to allow for sudden expansion or contraction.

D are three, four, or more stout wires surrounding but not touching the glass, and fastened at their ends to the rim C and the chimney B.

The object of my invention is to produce a more durable lamp-chimney than that already in use, and one that will not need so frequent cleaning.

In the common chimney made wholly of glass the upper part soon becomes smoked and has to be cleaned. In removing it, if warm, the slightest touch of moisture will make it break. If it falls it will break, and very frequently in removing or replacing it the rim at the bottom is broken and the chimney rendered useless. All of these objections are obviated by my invention. The smoke will be confined to the opaque metallic chimney, and need not be cleaned so often. The metallic rim bent on at the bottom prevents breakage there, and the wire guards protect that portion of the chimney which is glass from accidental blows or breakage by falling.

Having thus fully described my invention, what I claim as new, and desire to secure by Letters Patent, is—

1. The glass shade A, metallic chimney B, metallic rim C, and guards D, the whole being constructed, arranged, and operating as described.

2. The metallic rim C, constructed, arranged, and operating substantially as described.

In testimony that I claim the above I have hereunto set my hand this 17th day of April, 1865.

WM. H. CULP.

In presence of—
ELISABETH WATT,
JAMES WATT.